United States Patent [19]

Marzetta et al.

[11] Patent Number: 4,851,781
[45] Date of Patent: Jul. 25, 1989

[54] METHOD AND APPARATUS FOR INVESTIGATING A BOREHOLE USING AN ARRAY OF ELEMENTS

[75] Inventors: Thomas L. Marzetta, Bethel, Conn.; Weng C. Chew, Champaign, Ill.

[73] Assignee: Schlumberger Technology Corporation, Ridgefield, Conn.

[21] Appl. No.: 855,119

[22] Filed: Apr. 22, 1986

[51] Int. Cl.⁴ .............................................. G01V 3/20
[52] U.S. Cl. ..................................... 324/371; 324/366
[58] Field of Search ............... 324/338, 346, 351, 355, 324/366, 357, 373, 374, 375; 73/152; 340/852; 340/853; 367/81

[56] References Cited

U.S. PATENT DOCUMENTS

| | | | |
|---|---|---|---|
| 3,065,405 | 11/1962 | Jarrett | 324/373 |
| 3,388,325 | 6/1968 | Birdwell et al. | 324/373 |
| 3,493,849 | 2/1970 | Doll | 324/339 X |
| 4,117,394 | 9/1978 | Souhaité | 324/374 |
| 4,286,218 | 8/1981 | Bloomquist et al. | 324/350 |
| 4,468,623 | 8/1984 | Gianzero et al. | 324/374 X |
| 4,523,148 | 6/1985 | Maciejewski | 324/351 |

FOREIGN PATENT DOCUMENTS 685727  5/1964  Canada .............................. 324/373

Primary Examiner—Reinhard J. Eisenzopf
Assistant Examiner—Warren S. Edmonds
Attorney, Agent, or Firm—Peter Y. Lee; St. Onge Steward Johnston & Reens

[57] ABSTRACT

A method and apparatus investigating a circumferential segment of a borehole with an array of elements, which in effect spatially samples the segment, is described whereby, with a single circumferentially oriented array of spaced-apart elements sufficient overlap can be synthesized so as to reduce artifacts attributable to the spatial sampling. Measurements derived from circumferentially successive elements are combined, such as by summing to establish a desired overlap. In the described embodiment to a single lateral array of small electrodes is used to inject survey currents into the borehole wall and each current is measured. Measurements derived from pairs of successive survey currents are then summed to provide the desired overlap.

28 Claims, 2 Drawing Sheets

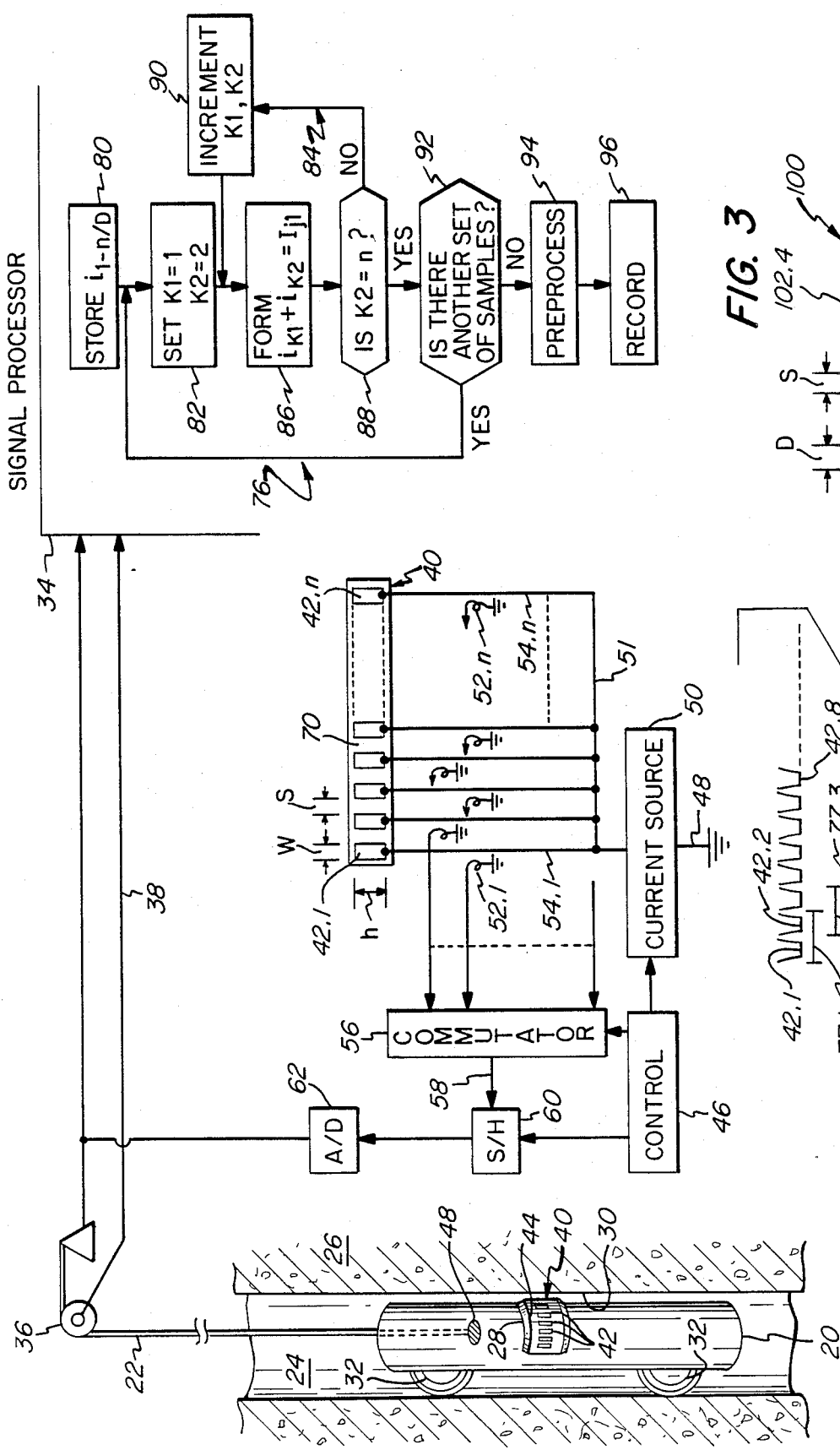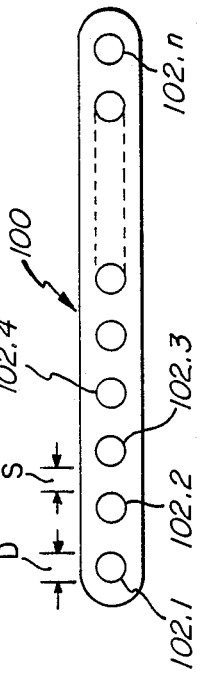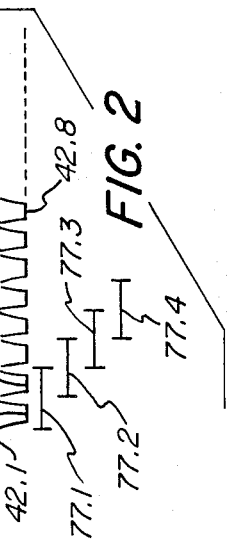

METHOD AND APPARATUS FOR INVESTIGATING A BOREHOLE USING AN ARRAY OF ELEMENTS

FIELD OF THE INVENTION

This invention generally relates to a method and apparatus for the explorations for hydrocarbons involving high resolution investigations of a borehole penetrating an earth formation. More specifically, this invention relates to such investigations using a lateral, circumferentially oriented, array of small electrodes.

BACKGROUND OF THE INVENTION

In U.S. Pat. No. 4,468,623 to Gianzero et al a tool and technique are described to make fine detailed resistivity investigations from which a fine display can be formed in a manner as shown and described in U.S. Pat. No. 4,567,759 to Ekstrom and Chan. The tool has a plurality of pads pressed against the borehole wall. Each pad carries an array of small electrodes. The array includes multiple, vertically spaced rows of electrodes with the electrodes of different rows arranged so as to provide, in the aggregate, an overlap as viewed along a circumferential direction. This overlap is desired to reduce visually disturbing, sawtooth type, aliasing effects (laterally distributed artifacts) when measurements obtained from the electrodes are recorded as a display.

However, when electrodes in different vertically displaced rows are used, precise depth shifting of measurements is needed to combine the measurements of one row obtained at one depth to those of another row obtained at the same depth. Although the rows are close together so that the amount of depth shifting is small, problems relating measurements at one depth to another still arise because of unusual tool movements. Special techniques are employed to provide so called "speed corrections" and can be quite effective, see for example U.S. Pat. No. 4,545,242 to Chan.

Canadian Patent No. 685,727 to Mann et al proposes a lateral array of small electrodes on a pad. Each electrode introduces, in sequence, a separately measurable survey current for an electrical investigation of the earth formation. The electrodes are placed in a single horizontal row with circumferential spacings between electrodes and a device is used to sequentially excite and measure survey currents from the electrodes.

SUMMARY OF THE INVENTION

With a technique in accordance with the invention, a high resolution spatially sampled investigation of a continuous segment of the borehole wall can be obtained without the need to use vertically spaced separate rows of investigation elements and thus without requiring depth shifting to obtain measurements with the required circumferential overlap.

This is achieved in accordance with the invention by employing a circumferentially oriented row of spaced-apart but closely spaced investigating elements. Measurements derived from the individual elements are combined in such a manner hat successive combinations relate to overlapping areas of the borehole wall that is opposite to the array. In this manner a sufficient spatial overlap is obtained to reduce laterally distributed artifacts attributable to the spatial sampling of a circumferential segment of the borehole wall.

As described herein with one technique in accordance with the invention an array of electrodes, whose dimensions are smaller than those described for use in the Gianzero patent, are arranged along a single circumferentially oriented row on a pad. Measurements obtained from the individual electrodes are combined in such a manner that successive combinations relate to circumferentially overlapping areas of the borehole wall. In this manner high resolution measurements which circumferentially overlap by fifty percent or more can be obtained sufficient to avoid horizontal aliasing.

In another embodiment in accordance with the invention a row of small electrodes is provided within an insulator. The current from each electrode is sufficiently unfocused so that it can diverge to cover a borehole area that is larger than the area of the electrode. This divergence is used in a manner whereby the currents from activated electrodes are permitted to spread to enter borehole areas that are opposite adjacent, but non-conducting electrodes. When the latter electrodes are activated and currents to the former electrodes are turned off, currents from the now-active electrodes spread to areas that include areas injected with currents from previously active adjacent electrodes. In this manner, a continuous circumferential segment of the borehole wall can be electrically investigated without aliasing yet with a high resolution.

With an array of investigation elements and a method in accordance with the invention, the depth shifting of measurements to obtain the proper circumferential overlap can be advantageously deleted. Less vertical space on a pad is needed for the array and errors in speed corrections can manifest themselves solely as uniform vertical expansions and contractions of a visual image made with the measurements rather than as "sawtooth" artifacts across the image. Furthermore, data sorting is considerably simplified and image visible streaking-type artifacts due to response variations with respect to vertical positions on the pad are eliminated. Real-time useful images can be generated during logging of a borehole with reduced pre-processing.

It is, therefore, an object of the invention to provide a simplified technique for investigating a continuous segment of the borehole wall with high resolution. It is a further object of the invention to provide a method and apparatus with which a single row of spaced-apart electrodes can be effectively used to electrically investigate a continuous circumferential segment of the borehole wall with sufficient spatial overlap to avoid artifacts and aliasing problems attributable to spatial sampling of the segment.

These and other objects and advantages of the invention can be understood from the following detailed description of several embodiments described in conjunction with the drawings.

BRIEF DESCRIPTION OF DRAWINGS

FIG. 1 is a schematic representation of an apparatus and used in accordance with the invention;

FIG. 2 is a partial sectional view of the electrode array in FIG. 1 to show the overlap achieved with the method of FIG. 1;

FIG. 3 is a front view in elevation of an electrode array for use in a method in accordance with the invention;

DETAILED DESCRIPTION OF DRAWINGS

Figure 4:
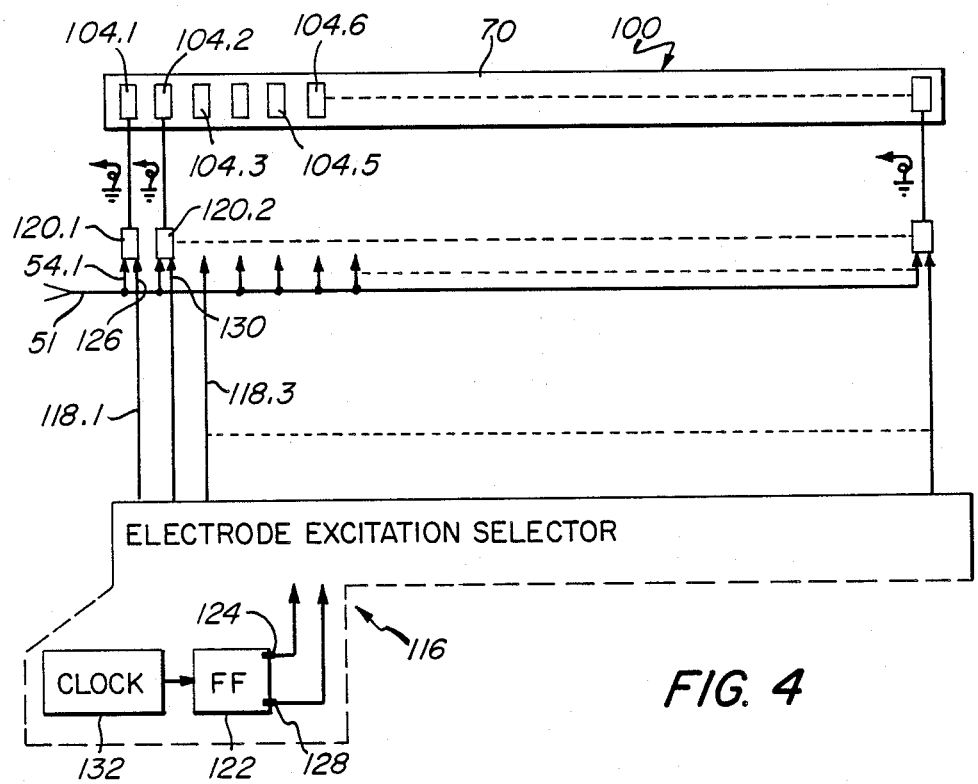
FIG. 4 is a schematic view of an apparatus used to operate an electrode array in accordance with the invention.

With reference to FIG. 1 an earth formation investigating tool 20 is shown suspended from a cable 22 in a borehole 24 penetrating earth formation 26. Tool 20 has, as more particularly described in the aforementioned patent to Gianzero a plurality of pads 28 that are pressed towards the borehole wall 30 by appropriate pressure arms 32 in a manner as is well known in the art. Cable 22 leads to appropriate surface-located equipment such as a signal processor 34. A depth sensor 36 associated with cable 22 provides a depth signal on line 38 for use by signal processor 34.

Each pad 28 has a circumferentially oriented array 40 of spaced-apart electrodes 42 embedded in a conductive surface 44. The conductive surface 44 and electrodes 42 are kept by control 46 at the same potential relative to a return electrode 48 located on tool 20. Survey current for the electrodes is delivered by a current source 50. Current sensors 52 are coupled to the currents flowing in each line 54 leading to an electrode 42. The sensed currents are applied to a commutator 56 whose output 58 is applied to a sample and hold network 60. An analog to digital converter 62 digitizes the sensed currents for transmittal along cable 22 to signal processor 34.

Electrode array 40 can be advantageously formed of a single row of spaced-apart electrodes that are spaced along a circumferential direction and are separated from each other and the surrounding pad surface 44 by a thin insulator 70. Each electrode 42 preferably has a rectangular shape with a height, h, in the vertical direction and a width, w, along the circumferential or lateral direction equal to h/2. The width, w, represents the highest circumferential resolution and similarly the height, h, establishes the highest vertical resolution. The dimensions of each individual electrode 42 is made so as to present a circumferential dimension w that is about one half of that used in the circular electrodes described in the aforementioned Gianzero et al patent. Thus, where the latter's circular electrodes had a diameter of about six millimeters the width, w, of electrodes 42 is about half of that or about three millimeters.

The spacing S between adjacent electrodes 42 and between them and pad surface 44 is preferably made so that the currents from the electrodes, in effect, investigate the entire borehole segment that is located opposite the array 40. Too small a spacing S, however, tends to result in the masking of the resistivity difference between the formation portions opposite adjacent electrodes.

The surface area of each electrode is made sufficiently large to provide a sufficiently low impedance for the injection of adequate survey current. A practical electrode size is about 3 mm wide and 6 mm high.

The electrode dimensions h×w represent the highest desired resolution. In order to then avoid artifacts and aliasing, an overlap combining technique 76 is used. By this technique the current measurements derived from selected successive electrodes are combined. For example with reference to FIG. 2 the measurements derived from electrodes 42.1 and 42.2 are combined to investigate a circumferential distance as denoted by line 77.1, then those from electrodes 42.2 and 42.3 over a length of line 77.2 and so on throughout the entire array 40 until the measurements derived from the last electrode pair 42.(n-1) and 42.n have been combined. As can be seen from FIG. 2, a fifty percent overlap is achieved, yet with spaced-apart electrodes that are arranged in a common circumferential row.

Technique 76 commences at 80 in FIG. 1 by storing the current measurements $i_l$ to $i_n$ for a particular depth D. At 82 values for measurement identifiers K1 and K2 are set at values of one and two respectively and a summing subroutine 84 is entered at 86. The measurements derived from the first two electrodes 42.1 and 42.2 are combined by summing and the result $I_{jl}$ stored.

A check is then made at 88 whether the measurements from the last electrode pair was summed. If not, the values for K1 and K2 are incremented by one at 90 and the step 86 is repeated.

Once test 88 recognizes the summing of the last pair of measurements a check is made at 92 whether there is another set of measurements for a different depth. If so, a return is made to step 82.

After completion of the summing of measurements over the desired depth range, the summed measurements are preprocessed at 94 for a visual display at 96. The preprocessing can be done in a manner as more particularly described in U.S. Pat. No. 4,567,759 to provide a display from which small features can be observed.

As a result of the summing of successive pairs of measurements, an equivalent area equal to the square of a button of dimensions h×h is sampled. The insulating region S between the buttons 42 can be considered negligible when S is much smaller than the h dimension. Hence, the combination of successive measurements $i_1$ and $i_2$ provides an equivalent overlap of about 50 percent. The single circumferentially oriented array 40 of n rectangular non-overlapping spaced-apart electrodes 42 is thus transformed into an array of n-1 square electrodes with 50 percent overlap.

Greater horizontal overlap can be achieved with the same resolution. For example, if rectangular electrodes of height h and a width w of h/3 are used then, while neglecting the thin insulating regions S between the electrodes 42, an array of square buttons with ⅔ overlap can be synthesized by successively summing measurements derived from three successive measuring elements 42 at step 86.

Figure 5:
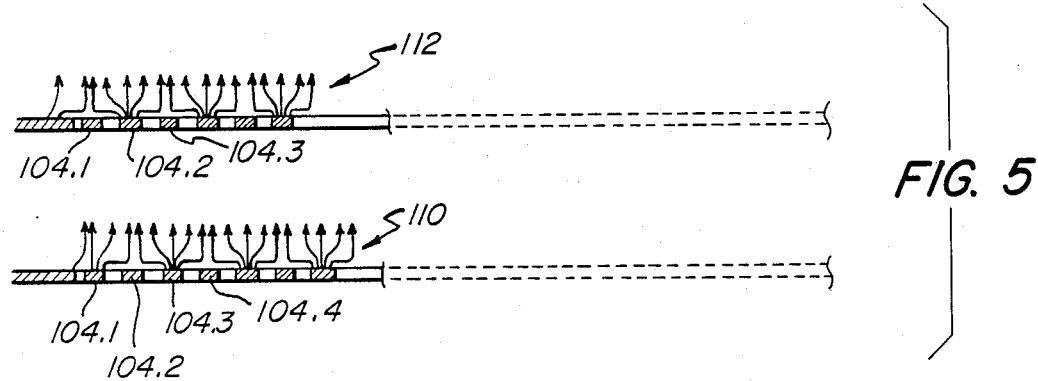
FIG. 5 is a partial sectional and schematic view of current flows during the operation of the apparatus of FIG. 4.

With reference to FIGS. 3–5 another technique for achieving horizontal overlap is described. An array 100 formed of round spaced-apart electrodes 102 as shown in FIG. 3 or rectangular spaced-apart electrodes as shown in FIG. 4 is mounted on a pad 28. The button electrodes 102 and 104 are made smaller than the electrodes 42 in FIG. 1 and spaced apart so that there is more insulation between the buttons 102, 104 and the conductive surface 44 of pad 28. Although surface 44 and the electrodes 102, 104 are kept at the same potential, the presence of a wider amount of insulation between the buttons and the pad 44 allows a defocusing of currents leaving the button. As a result each button can, in effect, sample a larger area than just its size.

In the embodiment illustrated in FIG. 4 the buttons 104 are selectively excited. Thus at one time the odd buttons 104.1, 104.3, 104.5 etc. are energized causing a current pattern as shown at 110 in FIG. 5 while the even buttons 104.2, 104.4 etc. are turned off or open circuited. During a next cycle the current to the odd buttons is off while that to the even buttons is turned on resulting in a current pattern as shown at 112.

Since the button currents are not focused, currents diverge and cross over to cover earth formation areas opposite the "off" buttons. In this manner each button sample overlaps the area sampled by its neighboring buttons by 50 percent. This is achieved by employing a button excitation selector 116 that is coupled through appropriate lines 118 to current switches 120 to which the current source, such as 50 of FIG. 1, is also connected. The button selector 116 alternately enables the odd and even switches 120. The button selector, in addition to interconnection wiring, includes a flip flop such as 122 having one output 124 connected to enabling inputs 126 of the odd switches 120 and its other output 128 connected to the enabling inputs 130 of the even switches 120. A clock 132 drives the flip flop 122.

Having thus described several techniques to obtain horizontally overlapped sample measurements of a circumferential segment of the borehole, the advantages of the invention can be appreciated. Objectionable artifacts in an image reconstructed from the measurements and attributable to speed corrections and depth shifting of data is avoided. The technique may be used with different investigating elements than current infecting electrodes. Such elements may be an array of sensors, sensitive to forms of energy such as electromagnetic, nuclear radiation and the like.

What is claimed is:

1. A method for investigating an earth formation, penetrated by a borehole, with an array of spaces-apart elements mounted on a tool which is moved along the borehole axis and where, as the tool is moved along the borehole axis, measurements from the elements are derived representative of a spatially sampled investigation, comprising the step of:
    combining measurements derived from successively spaced elements located along the array so as to obtain a plurality of measurements that successively overlap along the array by at least a desired amount to reduce artifacts attributable to the spatial sampling.

2. The method of claim 1 wherein the combining step comprises the step of summing the measurements derived from successively spaced elements in the array.

3. The method of claim 1 wherein the combining step comprises the step of combining measurements derived from successively spaced pairs of said elements.

4. The method of claim 1 wherein the combining step comprises combining measurements in groups of three successively spaced measurements.

5. The method of claim 1 wherein the array of spaced-apart elements is oriented along a circumferential direction to investigate circumferentially spaced locations that are in close proximity to each other on the borehole wall, with the combining step comprising the step of combining measurements derived from successively spaced elements to obtain a circumferential overlap so as to effectively investigate a continuous segment of the borehole wall as the tool is moved along the borehole axis, with the circumferential spacings separating adjacent elements being sufficiently small so as to be effectively negligible in the achievement of said circumferential overlap by the combining step.

6. A method for investigating an earth formation, penetrated by a borehole, with an electrical current generating tool which is moved along the borehole axis and where, as the tool is moved along the borehole axis, a circumferentially oriented array of discrete electrical survey currents is injected into a circumferential segment of the earth formation at the wall of the borehole, and wherein the survey currents have cross-sections selected to enable detection of fine resistivity anomalies, and wherein the magnitudes of the discrete survey currents are sensed to produce spatially sampled measurements for the detection of resistivity anomalies indicative of fracturing and stratigraphy in the earth formation segments in which the survey currents are injected, comprising the step of:
    combining measurements derived from successively spaced survey currents located along the array to obtain measurements that successively circumferentially overlap each other by at least a desired amount to reduce artifacts attributable to spatial sampling of the circumferential segment.

7. The method of claim 6 wherein the combining step comprises the step of summing the measurements derived from successively spaced locations in the circumferentially oriented array of survey currents.

8. The method of claim 6 wherein the combining step comprises the step of combining successively spaced pairs of said measurements.

9. The method of claim 6 wherein the combining step comprises combining measurements in groups of three successively spaced measurements.

10. The improved method of claim 6 and further including the step of generating the discrete electrical survey currents from circumferentially spaced locations that are in close proximity to each other, with the circumferential spacings separating adjacent survey currents being sufficiently small so as to be effectively negligible in the achievement of said circumferential overlap by the combining step.

11. The method of claim 10 wherein the discrete electrical survey currents are initially generated with rectangular cross sections.

12. The method of claim 11 wherein combined measurements individually relate to borehole wall areas that are generally square-shaped.

13. A method for investigating an earth formation, penetrated by a borehole, with an electrical current generating tool which is moved along the borehole axis, comprising the steps of:
    generating an array of discrete survey currents spaced along a circumferential direction with sufficiently close spacing of the survey currents so as to enable a spatially sampled electrical investigation of a continuous segment of the wall of the borehole with a single circumferential array of the survey currents and with the survey currents having cross sections selected to enable detection of fine resistivity anomalies;
    measuring the magnitude of the survey currents in the array for successive depths of the tool and generating measurements representative thereof; and
    combining measurements related to a common depth and derived from successively spaced locations in the circumferentially oriented array of survey currents to obtain measurements that circumferentially overlap each other by at least a desired amount to reduce artifacts attributable to a spatial sampling of the continuous segment.

14. The method of claim 13 wherein the combining step comprises the step of summing measurements derived from successively spaced locations in the circumferentially oriented array of survey currents so as to achieve an overlap of the order of at least about fifty percent.

15. The method of claim 14 wherein the summing step comprises the step of combining successively spaced pairs of said measurements.

16. The method of claim 13 wherein the step of generating the survey currents comprises generating the discrete electrical survey currents from circumferentially spaced locations that are in close proximity to each other, with the circumferential spacings separating adjacent survey currents being sufficiently small so as to be effectively negligible in the achievement of said circumferential overlap by the combining step.

17. The method of claim 16 wherein the discrete electrical survey currents are initially generated with rectangular cross sections.

18. The method of claim 17 wherein the combined measurements individually relate to borehole wall areas that are generally square-shaped.

19. A method for investigating an earth formation penetrated by a borehole with an electrical current generating tool which is moved along the borehole axis and where, as the tool is moved along the borehole axis, a circumferentially oriented array of electrodes is used to inject discrete electrical survey currents into the earth formation at the wall of the borehole and wherein the survey currents have cross sections selected to enable detection of fine resistivity anomalies, and wherein the magnitudes of the discrete survey currents are sensed to produce measurements for the detection of resistivity anomalies indicative of fracturing and stratigraphy in the earth formation segments in which the survey currents are injected, comprising the steps of:
  injecting, at a first depth, survey currents into the earth formation from a first set of electrodes of the array and measuring the magnitude of the individual survey currents;
  turning the survey currents from the first set of electrodes off;
  injecting survey currents, at substantially said first depth, from a second set of electrodes of the array and which are spatially interleaved between the electrodes in the first set and measuring the magnitude of individual survey currents, from the second set of electrodes;
  turning the survey currents from the second set of electrodes off; and
  repeating said steps for different depths.

20. An apparatus for investigating an earth formation, penetrated by a borehole, with a tool which is moved along the borehole axis, comprising:
  means including an array of spaced-apart elements mounted on the tool to produce spatially sampled measurements related to a segment of the borehole; and
  means for combining measurements derived from successively spaced elements in the array to obtain measurements that overlap each other by at least a desired amount to reduce artifacts attributable to the spacial sampling.

21. The apparatus of claim 20 wherein the combining means comprises summing means for summing measurements derived from successively spaced elements in the array so as to achieve an overlap of the order of at least about 50 percent.

22. The apparatus of claim 21 wherein the summing means comprises means for combining measurements derived from successively spaced pairs of said elements.

23. The apparatus of claim 20 wherein the means for producing said measurements comprises an array of measuring elements which are in close proximity to each other, with the spacings separating adjacent elements being sufficiently small so as to be effectively negligible in the achievement of said overlap by the means for combining.

24. An apparatus for investigating an earth formation, penetrated by a borehole, with an electrical current generating tool which is moved along the borehole axis, comprising:
  means for generating an array of discrete survey currents spaced along a circumferential direction with sufficiently close spacing of the survey currents so as to enable spatially sampled electrical investigation of a continuous segment of the wall of the borehole with a single circumferential array of the survey currents and with the survey currents having cross sections selected to enable detection of fine resistivity anomalies;
  means for measuring the magnitude of the survey currents in the array for successive depths of the tool and generating measurements representative thereof; and
  means for combining measurements related to a common depth and derived from successively spaced locations in the circumferentially oriented array of survey currents to obtain measurements that circumferentially overlap each other by at least a desired amount to reduce artifacts attributable to spatial sampling of the segment.

25. The apparatus as claimed in claim 24 wherein the combining means comprises summing means for summing measurements derived from successively spaced locations in the circumferentially oriented array of survey currents so as to achieve an overlap of the order of at least about 50 percent.

26. The apparatus of claim 25 wherein the summing means comprises means for combining successively spaced pairs of said measurements.

27. The apparatus of claim 24 wherein the means for generating the survey currents comprises means for generating the discrete electrical survey currents from circumferentially spaced locations that are in close proximity to each other, with the circumferential spacings separating adjacent survey currents being sufficiently small so as to be effectively negligible in the achievement of said circumferential overlap by the combined step.

28. An apparatus for investigating an earth formation, penetrated by a borehole, with an electrical current generating tool which is moved along the borehole axis, comprising:
  an array of electrodes embedded in an insulator and mounted on the tool and with the electrodes spaced along a circumferential direction;
  means for selectively actuating a first set of said electrodes in the array to cause the emission of current therefrom and deactivating a second set of electrodes in the array, and activating the second set while deactivating the first set of electrodes, said first and second set of electrodes being interleaved with each other so that alternate electrodes are activated and deactivated; and
  said electrodes further being so sized that currents therefrom diverge to enter areas of the borehole opposite non-active adjacent electrodes to obtain a circumferentially effective overlap of said circumferentially spaced electrodes.

* * * * *